United States Patent
Rausch et al.

(10) Patent No.: US 11,987,908 B2
(45) Date of Patent: May 21, 2024

(54) SAFETY BELT AND METHOD FOR PRODUCING A SAFETY BELT

(71) Applicant: ZF AUTOMOTIVE GERMANY GMBH, Alfdorf (DE)

(72) Inventors: Martina Rausch, Remshalden (DE); Anna-Lena Weber Geb. Prott, Geldersheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 461 days.

(21) Appl. No.: 17/280,904

(22) PCT Filed: Sep. 27, 2019

(86) PCT No.: PCT/EP2019/076184
§ 371 (c)(1),
(2) Date: Mar. 28, 2021

(87) PCT Pub. No.: WO2020/069998
PCT Pub. Date: Apr. 9, 2020

(65) Prior Publication Data
US 2021/0339700 A1 Nov. 4, 2021

(30) Foreign Application Priority Data
Oct. 1, 2018 (DE) .................. 10 2018 124 241.7

(51) Int. Cl.
| | |
|---|---|
| *B60R 22/12* | (2006.01) |
| *D03D 1/00* | (2006.01) |
| *D03D 11/00* | (2006.01) |
| *D03D 15/00* | (2021.01) |
| *D03D 15/275* | (2021.01) |
| *D03D 15/67* | (2021.01) |

(52) U.S. Cl.
CPC ........... *D03D 1/0035* (2013.01); *B60R 22/12* (2013.01); *D03D 11/00* (2013.01); *D03D 15/00* (2013.01); *D03D 15/275* (2021.01); *D03D 15/67* (2021.01); *D10B 2101/12* (2013.01); *D10B 2101/20* (2013.01); *D10B 2401/16* (2013.01); *D10B 2505/122* (2013.01)

(58) Field of Classification Search
CPC ..................................................... B60R 22/12
See application file for complete search history.

(56) References Cited

U.S. PATENT DOCUMENTS 10,143,043 B1 * 11/2018 Elson ..................... B60R 22/48

FOREIGN PATENT DOCUMENTS

| CN | 106043209 A | 10/2016 | |
| CN | 111791828 A | * 10/2020 | ............. B60R 22/00 |

(Continued)

OTHER PUBLICATIONS

PCT International Search Report for corresponding International Application Serial No. PCT/EP2019/076184, dated Dec. 6, 2019, pp. 1-4.

*Primary Examiner* — Timothy J Brindley
(74) *Attorney, Agent, or Firm* — TAROLLI, SUNDHEIM, COVELL & TUMMINO L.L.P.

(57) ABSTRACT

The invention describes a seat belt (10) for a motor vehicle comprising a webbing (12) that includes plural layers (26, 28, 30) at least one layer (26) of which comprises an electric heating element (26). The invention further describes a method for manufacturing such seat belt (10).

19 Claims, 2 Drawing Sheets

(56) References Cited

FOREIGN PATENT DOCUMENTS

| | | | | |
|---|---|---|---|---|
| DE | 102017005443 | A1 | 2/2018 | |
| DE | 202018005760 | U1 * | 3/2019 | ............. B60R 22/12 |
| DE | 102020125367 | A1 * | 3/2022 | |
| DE | 102021106308 | A1 * | 9/2022 | |
| JP | 2015199437 | A | 11/2015 | |
| JP | 2015200036 | A1 | 11/2015 | |
| JP | 2015214261 | A | 12/2015 | |
| JP | 2016043806 | A | 4/2016 | |
| WO | WO-2021115008 | A1 * | 6/2021 | ......... B60H 1/00271 |
| WO | WO-2022072656 | A1 * | 4/2022 | ............. A61B 5/746 |
| WO | WO-2022223698 | A1 * | 10/2022 | |

* cited by examiner

SAFETY BELT AND METHOD FOR PRODUCING A SAFETY BELT

RELATED APPLICATIONS

The present invention is a U.S. National Stage under 35 USC 371 patent application, claiming priority to Serial No. PCT/EP2019/076184, filed on 27 Sep. 2019; which claims priority from 10 2018 124 241.7, filed 1 Oct. 2018, the entirety of both of which are incorporated herein by reference.

TECHNICAL FIELD

The invention relates to a seat belt for a motor vehicle. Furthermore, the invention relates to a method for manufacturing a seat belt for a motor vehicle.

BACKGROUND

Seat belts for motor vehicles include a webbing that is usually made from a woven fabric, for example from PET. In general, a seat belt serves to fix a vehicle occupant on the vehicle seat, if the is vehicle strongly decelerated and corresponding forces act upon the vehicle occupant. The seat belt may further be part of a safety system which, inter alia, comprises a belt tensioner so that the seat belt, especially the webbing, is tensioned in case a crash or the like is imminent. This ensures the vehicle occupant to be fixed to the vehicle seat via the seat belt at an early stage.

Typically, the seat belt itself has no additional functions, however.

Moreover, for a conventional motor vehicle it is known that the passenger compartment is heated by means of the waste heat of the internal combustion engine so that the vehicle occupants are warmed via the atmosphere in the passenger compartment. In electric vehicles, on the other hand, the required heating capacity must be provided by the vehicle battery which additionally provides the electrical energy for operating the electric motor.

Based on the electric heating capacity, the available cruising range of the electric vehicle is reduced, however, when the heating is operating. Therefore, a heating system is desired which requires as little electrical power as possible and still does not impair the occupants' comfort.

SUMMARY

It is the object of the invention to provide a possibility of efficiently warming a vehicle occupant.

In accordance with the invention, the object is achieved by a seat belt for a vehicle comprising a webbing that includes plural layers at least one layer of which comprises an electric heating element. The layer comprising an electric heating element will also be referred to as heating layer in the following. In this respect, according to the invention, it is provided to place the heat source and, resp., the heating unit provided by the electric heating element closer to the vehicle occupant so that the vehicle occupant can be efficiently warmed. This is possible as, according to the invention, the air in the passenger compartment of the vehicle need not be warmed via the heating system. Thus, the heating capacity required is considerably reduced, as the vehicle occupant is warmed directly through the seat belt, especially through the electric heating element provided in the heating layer.

The heating element extends at least over a partial area of the webbing in the longitudinal direction. Thus, it is possible for a desired portion of the webbing to exhibit a defined heating profile. In general, this allows the electrical power being consumed to be utilized as efficiently as possible, if it is not necessary to heat the entire webbing, and especially areas which are not adjacent to the vehicle occupant's body.

The layer comprising the heating element, viz. the heating layer, may be assigned to at least two webbing layers which are assigned to opposed sides of the layer comprising the heating element, viz. the heating layer, especially wherein the two webbing layers are directly adjacent to opposed sides of the layer comprising the heating element. In this way, a three-layer webbing can be formed in a sandwich design that includes two outer webbing layers which sandwich-like enclose the heating layer or, resp., the layer comprising the heating element. In this way, the heating material is accommodated in the webbing, inter alia protected effectively against direct external influences such as water, sweat and/or against mechanical influences such as abrasion. For the protection against sweat, water and/or further influences, the heating layer can additionally comprise an insulation and/or and insulating coating. Moreover, such arrangement enables easy processing of the different layers to form a webbing in which processing the individual layers are first superimposed and are then sewn to each other, for example. Consequently, cost-efficient manufacture is resulting. It is especially imaginable that the individual layers are directly interconnected in a joint weaving process. In this way, too, the seat belt can be manufactured in a cost-efficient manner.

In general, each layer of the webbing, viz. the heating layer and/or the webbing layer, can be a fabric layer that comprises PET, for example.

The electric heating element can include an electric heating material that is coupled to, such as, e.g., interwoven with, webbing material of at least one central layer. Especially, the heating material comprises at least one conductive yarn, for example a carbon fiber and/or a silver thread, at least one conductive wire and/or at least one conductive strand, for example made from copper and/or stainless steel, especially V4A stainless steel (1.4571). This is a substantially flexible heating material that can adapt to the shape of the webbing so that the heating material will not render the webbing too stiff. Furthermore, the conductive yarn, the conductive wire and/or the conductive strand can include an insulation such as an insulating enamel coating. Moreover, the heating material can be easily interwoven with the assigned layer due to the corresponding shape, thus allowing for safe fixation and simple manufacture of the seat belt. In this way, also proper heat transfer can be realized in a desired geometry.

Equally, the heating element can be interwoven at least partially with the at least one layer, viz. with the fabric material of the layer that comprises the heating element. The heating material of the heating element thus can be interwoven with the assigned layer during the weaving process so that the heating material is safely fastened to said layer.

Moreover, the heating layer comprising the heating element can be safely connected to the at least one further layer of the webbing in a simple manner so that the heating element, especially the heating material of the heating element, is safely received in the webbing.

The heating layer can be interwoven with the webbing layer through the heating element, especially through the heating material of the heating element.

After at least a partial area of the webbing, the heating element can be passed onto the surface thereof. This enables the heating element to be easily contacted on the surface of the webbing to close an electric circuit assigned to the electric heating element.

In particular, a solder and/or crimp bonding is provided to apply an electrical contact to the heating element. Accordingly, the electric circuit can be closed thereby.

In this way, it can further be safeguarded that the webbing is heated only partially, as the heating element extends over a partial area of the webbing only and does not extend through the entire webbing.

In addition, the seat belt may include an end fitting that includes a power supply interface to which the electric heating element is electrically coupled. Consequently, an electrical contact is applied to the end side of the electric heating element, for which purpose the end fitting is suited, as the latter typically is not provided in the motion area of the vehicle occupants so that any inadvertent damaging can be effectively prevented. Moreover, further components of the seat belt which have a more complex design and less free construction space such as, e.g., the webbing retractor can remain unchanged.

From the power supply interface at the end fitting a line can thus extend to the point of the surface of the webbing where the heating element is passed out of the webbing, especially for solder and/or crimp bonding.

Furthermore, according to the invention, the object is achieved by a method for manufacturing a seat belt for a motor vehicle, wherein at least one layer of a webbing and at least one electric heating element are provided. Then the electric heating element is coupled to the at least one layer in a weaving process.

The afore-mentioned advantages for the seat belt are analogously resulting for the method for manufacturing a seatbelt, as by the method a seat belt comprising an integrated electric heating system can be manufactured which is placed in direct vicinity of the vehicle occupant so that more efficient heating can take place. In addition, the seat belt including the integrated electric heating system can be manufactured in an especially simple and cost-efficient manner, as the electric heating element is interwoven with the layer.

Basically, an electric heating system is thus integrated in the seat belt.

There can be provided two webbing layers, with the electric heating element being substantially interposed between the two webbing layers, especially with the two webbing layers being interconnected, for example at the periphery. This enables a multi-layer, especially three-layer, webbing to be easily realized, wherein especially the layer comprising the electric heating element is received by the two webbing layers and, thus, is protected against direct influence such as water, sweat and/or mechanical influence such as abrasion.

During manufacture of the webbing, the heating element can be interwoven with the at least one layer of the webbing, i.e., also the webbing layers.

Another aspect provides the heating element to be passed, after at least one partial area of the webbing, onto the surface of the latter. Consequently, the heating element extends only over a partial area of the webbing so that it is not the entire webbing but only the respective partial area that is heated. Especially during the weaving process, the heating element is passed onto the surface. In this way, already during the weaving process a desired heat transfer can be predefined, especially as regards the heating profile. Basically, this allows easy access of the respective contact point of the electric heating element.

Furthermore, the electric heating element can be contacted, especially by soldering or crimping, on the surface of the webbing. This allows for a simple configuration of the contact point of the electric heating element as well as the bonding thereof.

Also, the electric heating element may comprise an electric heating material that is interwoven with a carrier material of the layer. This allows for safe fixation of the heating material to the layer inside the webbing. The carrier material may be a non-woven, a woven fabric or a fabric material with which the electric heating material is interwoven.

In general, each layer of the webbing may be a fabric layer.

BRIEF DESCRIPTION OF THE FIGURES

Further advantages and characteristics of the invention will be evident from the following description and the drawings which will be referred to, and wherein.

DETAILED DESCRIPTION

Figure 1:
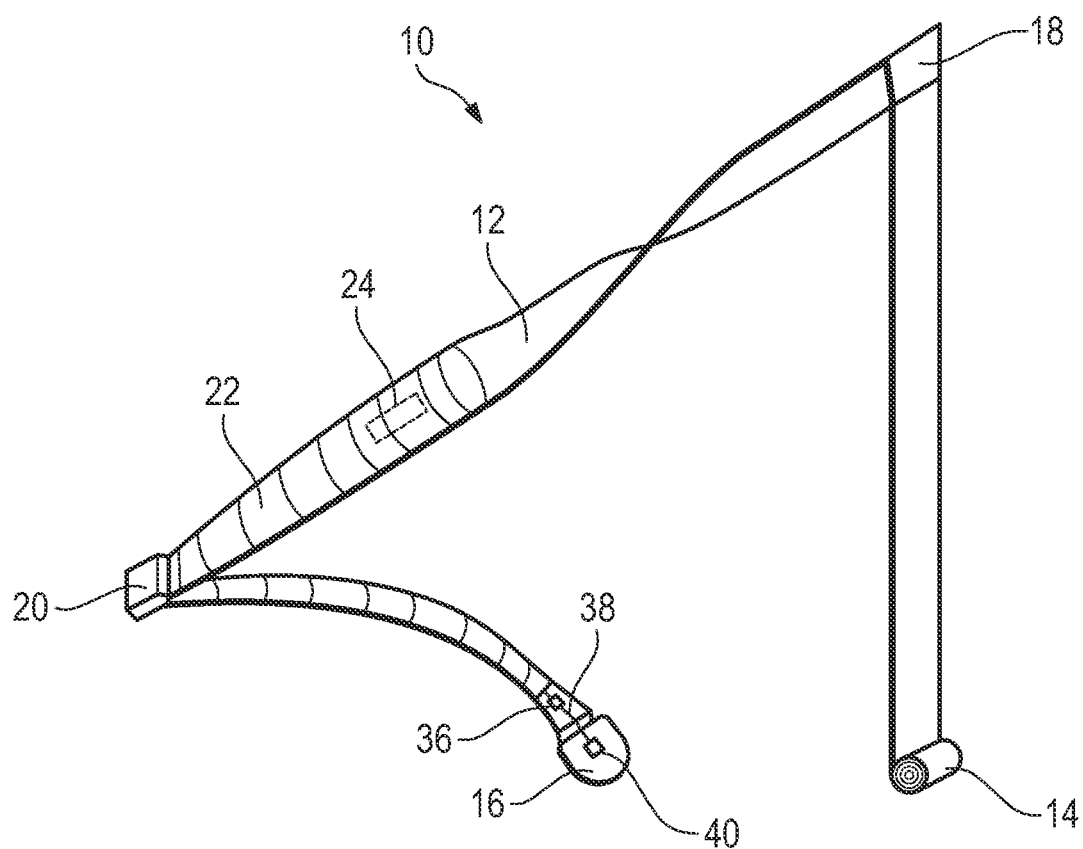
FIG. 1 shows a schematic view of a seat belt according to the invention comprising a webbing.

FIG. 1 illustrates a seat belt 10 for a motor vehicle comprising a webbing 12 a first end of which is assigned to a webbing retractor 14 and a second end of which is assigned to an end fitting 16.

Moreover, the seat belt 10 comprises a deflecting device 18 via which the webbing 12 is appropriately deflected.

In addition, a plug tongue 20 through which the webbing 12 is passed is movably arranged at the webbing 12.

The webbing 12 may include at least a portion or a partial area 22 in which an electric heating element 24 is provided. The partial area 22 extends, when viewed in the longitudinal direction of the webbing 12, at least over a section of the webbing 12.

Along the length of the partial area 22 the heating surface can be appropriately adjusted, as the electric heating element 24 is provided in the partial area 22.

Figure 2:
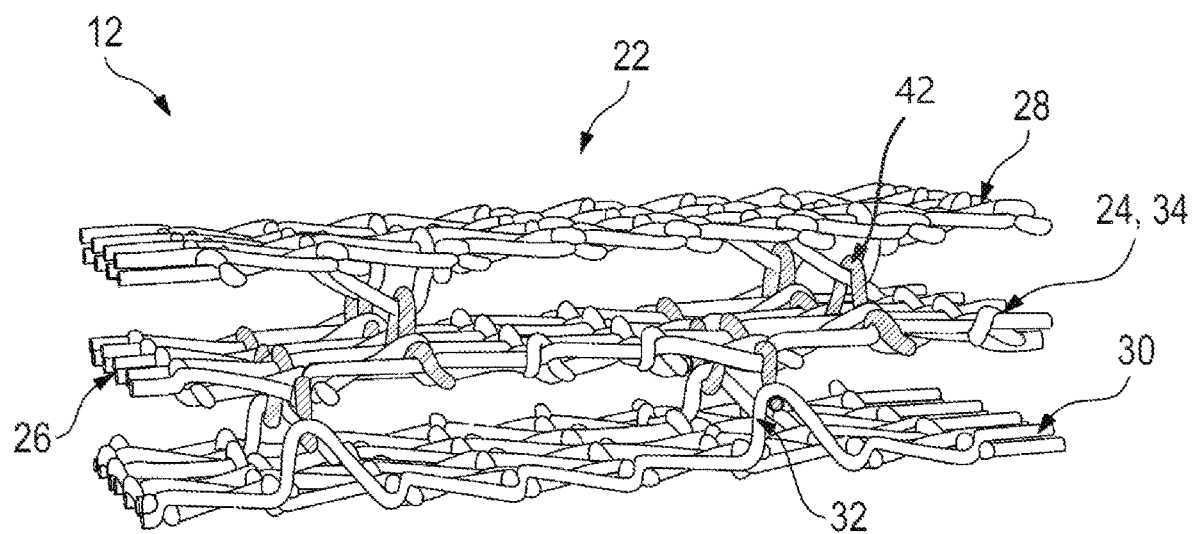
FIG. 2 shows a schematic sectional view of a three-layer webbing of a seat belt according to the invention.

In FIG. 2, the partial area 22 of the webbing 12 is shown in greater detail, which reveals that the webbing 12 has a three-layer design in the shown embodiment.

The webbing 12 has a central layer 26 comprising the heating element 24 which can also be referred to as heating layer.

The heating layer 26 has two opposed sides each of which is contacted directly by a webbing layer 28, 30. This means that the heating layer 26 is sandwiched between the two webbing layers 28, 30 so that it is protected to the outside.

Each of the heating layer 26 and the webbing layers 28, 30 can be configured as fabric layers, especially with the layers 26 to 30 comprising PET.

The webbing layers 28, 30 can be connected to, especially appropriately interwoven with, the heating layer 26 via additional backing yarns 32 or via backings and/or ties.

In the partial area 22 shown in FIG. 2, the webbing layer 28 is connected to the heating layer 26 in that a warp or backing yarn 32 of the webbing layer 28 is passed preferably regularly downward and is connected to a weft yarn 42 of the heating layer 26. The webbing layer 30 is connected to the heating layer 26 in that a warp or backing yarn 32 of the webbing layer 30 is passed preferably regularly upward and is connected to a weft yarn 42 of the heating layer 26.

The electric heating element 24 may further include an electric heating material 34 which is appropriately supplied with current to provide thermal heat due to the ohmic losses, by which thermal heat a vehicle occupant is warmed after having fastened his/her seat belt 10.

The electric heating material 34 may be a fiber within the fabric of the heating layer 26 so that it can be incorporated into the webbing 12 immediately during the weaving process.

In the illustrated embodiment, the electric heating material 34 forms warp yarns of the heating layer 24. By connecting the webbing layers 28 and 30 to the heating layer 26 through the weft yarns 42, the electric heating material 34 can be achieved to be covered by the webbing layers 28, 30 and thus to be protected against direct influence.

In general, the electric heating material 34 may comprise at least one conductive yarn, such as a carbon fiber and/or a silver thread, at least one conductive wire and/or at least one conductive strand, for example made from copper and/or stainless steel and/or steel having a copper coating. In addition, the electric heating material 34 may comprise an insulation that is formed by an insulating enamel layer, for example.

It would also be imaginable that the heating layer 26 is not interwoven with the webbing layers 28, 30, but is only received inside the two webbing layers 28, 30 which are sewn to each other at the periphery so that the heating layer 26 is fixed within the surrounding webbing layers 28, 30.

As an alternative, it is imaginable that the webbing layers 28, 30 are interwoven and the heating layer 26 is interposed therebetween. To this end, the electric heating material 34 may be provided to be formed of plural conductive fibers juxtaposed in parallel, especially conductive yarns and/or conductive wires and/or conductive strands. For connecting the two webbing layers 28 and 30, the warp yarns of the upper webbing layer 28 and, resp., the lower webbing layer 30 are passed through between the conductive fibers of the heating layer 26 downward to the lower webbing layer 30 and, resp., upward to the upper webbing layer 28 and are connected via the weft yarn to each of the lower webbing layer 30 and, resp., the upper webbing layer 28.

Especially at the end of the partial area 22, the heating element 24 is passed onto the surface of the webbing 12 so that there it can be electrically coupled via the solder and/or crimp bonding 36.

For this purpose, an electric line 38 extends from the end fitting 16 to the solder and/or crimp bonding 36 so as to form an electric circuit with the heating element 24 and, resp., to electrically contact the heating element 24. For this purpose, the end fitting 16 includes a power supply interface 40 to which the line 38 is coupled.

Accordingly, the heating element 24 is electrically coupled to the power supply interface 40 through the electric line 38.

The invention claimed is:

1. A seat belt (10) for a motor vehicle, comprising a webbing (12) that includes two webbing layers (28, 30), which define a webbing interior, and a heating layer (26) substantially in the webbing interior, the heating layer (26) including an electric heating element (24) having an end penetrating one of the webbing layers (28, 30) from an interior surface of the penetrated webbing layer (28, 30) to an exterior surface of the penetrated webbing layer (28, 30), the penetrating end of the electric heating element (24) being connected to the exterior surface of the penetrated webbing layer (28, 30).

2. The seat belt according to claim 1, wherein the heating element (24) extends at least over a partial area of the webbing (12) in the longitudinal direction.

3. The seat belt according to claim 1, wherein the electric heating element (24) includes an electric heating material (34) which is coupled to webbing material of the heating layer (26).

4. The seat belt according to claim 1, wherein the heating element (24) is at least partially interwoven with webbing material of the heating layer (26).

5. The seat belt according to claim 1, wherein the seat belt (10) includes an end fitting (16) connected to an end of the webbing (12), the end fitting (16) having a power supply interface (40) thereon, the power supply interface (40) being electrically coupled to the end of the electric heating element (24).

6. The seat belt according to claim 5, wherein the end of the electric heating element (24) is connected to the exterior surface of the webbing (12) via a solder and/or crimp bonding (36), an electric line (38) extending from the power supply interface (40) to the solder and/or crimp bonding (36) such that the electric heating element (24) is electrically connected to the power supply interface (40) via the electric line (38) and the solder and/or crimp bonding (36).

7. A method for manufacturing the seat belt (10) according to claim 1, comprising the steps of:
    providing a webbing material and the electric heating element (24), and
    coupling the webbing material to the electric heating element (24) in a weaving process to form the heating layer (26).

8. The method according to claim 7, wherein the two webbing layers (28, 30) are provided, wherein the electric heating element (24) is interposed substantially between the two webbing layers (28, 30), wherein the two webbing layers (28, 30) are interconnected, for example at the periphery.

9. The method according to claim 7, further comprising:
    providing the two webbing layers (28, 30),
    interposing the heating layer (26) between the two webbing layers (28,30) such that the heating layer (26) and electric heating element (24) are in the webbing interior defined by the two webbing layers (28, 30), and
    passing the end of the electric heating element (24) entirely through one of the webbing layers (28,30) from the webbing interior to the exterior surface of the webbing (12).

10. The method according to claim 7, wherein the end of heating element (24) is contacted on the exterior surface of the webbing (12) by means of soldering or crimping.

11. The seat belt according to claim 3, wherein the heating material (34) comprises at least one conductive carbon fiber yarn, at least one conductive silver yarn, at least one conductive wire, at least one conductive copper strand and/or at least one conductive stainless steel strand.

12. The seat belt according to claim 5, wherein the end fitting (16) is connected to a first end of the webbing (12), the seat belt (10) further comprising:
    a webbing retractor (14) connected to a second end of the webbing (12); and
    a plug tongue (20) on and moveable along the webbing (12) between the first and second ends of the webbing (12).

13. A seat belt (10) for a motor vehicle, comprising a webbing (12) that includes two webbing layers (28, 30), which define a webbing interior, and a heating layer (26) substantially in the webbing interior, each webbing layer (28, 30) including yarns (32) of webbing material, the heating layer (26) including first yarns of an electric heating material (34) and second yarns (42) of webbing material, the first yarns of electric heating material (34) being configured to provide thermal heat when supplied with current, portions of the second yarns (42) of the heating layer (26) being connected to the yarns (32) of each webbing layer (28, 30).

14. The seat belt according to claim 13, wherein a portion of the yarns (32) of a first one of the webbing layers (28) is passed downward to the heating layer (26) and connected with a portion of the second yarns (42) of the heating layer (26) via interweaving, a portion of the yarns (32) of a second one of the webbing layers (28) being passed upward to the heating layer (26) and connected with a portion of the second yarns (42) of the heating layer (26) via interweaving.

15. The seat belt according to claim 14, wherein the yarns (32) of the first and second webbing layers (28, 30) are warp yarns, the first yarns of the heating layer (26) are warp yarns, and the second yarns (42) of the heating layer (26) are weft yarns.

16. The seat belt according to claim 13, wherein ends of the first yarns of the electric heating material (34) extend entirely through one of the webbing layers (28, 30) to an exterior surface of the webbing (12).

17. A seat belt (10) for a motor vehicle, comprising:

a first webbing layer (28) including first and second yarns of webbing material;

a second webbing layer (30) including first and second yarns of webbing material, the first yarns of the second webbing layer (30) being connected to the second yarns of the first webbing layer (28) at the first webbing layer (28), the first yarns of the first webbing layer (28) being connected to the second yarns of the second webbing layer (30) at the second webbing layer (30); and a heating layer (26) interposed between the first and second webbing layers (28, 30), the heating layer (26) including conductive fibers (34) configured to provide thermal heat when supplied with current, the first yarns of each of the first and second webbing layers (28, 30) extending through the heating layer (26) between the conductive fibers (34) of the heating layer (26) to the other of the first and second webbing layers (28, 30).

18. The seat belt according to claim 17, wherein the first yarns of the first and second webbing layers (28, 30) are warp yarns and the second yarns of the first and second webbing layers (28, 30) are weft yarns.

19. The seat belt according to claim 17, wherein ends of the conductive fibers (34) extend entirely through one of the first and second webbing layers (28, 30) to an exterior surface of the webbing (12).

* * * * *